(12) United States Patent
Biskeborn et al.

(10) Patent No.: US 8,004,792 B2
(45) Date of Patent: Aug. 23, 2011

(54) MAGNETIC WRITE TRANSDUCER

(75) Inventors: Robert Glenn Biskeborn, Hollister, CA (US); Leif Stefan Kirschenbaum, Napa, CA (US)

(73) Assignee: International Business Machines Corporation, Armonk, NY (US)

( * ) Notice: Subject to any disclaimer, the term of this patent is extended or adjusted under 35 U.S.C. 154(b) by 652 days.

(21) Appl. No.: 11/734,605

(22) Filed: Apr. 12, 2007

(65) Prior Publication Data

US 2008/0253022 A1  Oct. 16, 2008

(51) Int. Cl.
*G11B 5/17* (2006.01)
*H01L 27/08* (2006.01)
*H01F 5/00* (2006.01)

(52) U.S. Cl. ............. 360/123.56; 360/123.15; 336/200; 257/531

(58) Field of Classification Search ............. 360/123.15, 360/123.35, 123.39, 123.56; 336/200; 257/531
See application file for complete search history.

(56) References Cited

U.S. PATENT DOCUMENTS

| | | | | |
|---|---|---|---|---|
| 4,310,821 A | | 1/1982 | Frances | 336/200 |
| 4,416,056 A | * | 11/1983 | Takahashi | 29/603.24 |
| 5,022,141 A | * | 6/1991 | Nagata et al. | 29/603.24 |
| 5,218,498 A | * | 6/1993 | Jagielinski | 360/316 |
| 5,448,822 A | | 9/1995 | Wu et al. | 29/603 |
| 6,218,925 B1 | * | 4/2001 | Iwao | 336/200 |
| 6,441,994 B1 | * | 8/2002 | Wang et al. | 360/123.39 |
| 6,466,401 B1 | | 10/2002 | Hong et al. | 360/123 |
| 6,480,086 B1 | * | 11/2002 | Kluge et al. | 336/200 |
| 6,593,841 B1 | | 7/2003 | Mizoguchi et al. | 336/200 |
| 6,970,323 B2 | * | 11/2005 | Kamijima | 360/123.39 |
| 2001/0020885 A1 | * | 9/2001 | Takeuchi et al. | 336/200 |
| 2001/0053044 A1 | | 12/2001 | Rea et al. | 360/123 |
| 2002/0101683 A1 | | 8/2002 | Katura | 360/123 |
| 2003/0151849 A1 | | 8/2003 | Sasaki et al. | 360/123 |
| 2003/0169534 A1 | | 9/2003 | Emilio Santini | 360/126 |
| 2004/0150911 A1 | * | 8/2004 | Sasaki et al. | 360/126 |
| 2005/0190035 A1 | * | 9/2005 | Wang | 336/200 |
| 2006/0284719 A1 | * | 12/2006 | Lee | 336/223 |

OTHER PUBLICATIONS

A. Chiu et al., "Thin-film inductive heads" IBM Journal Research Development, vol. 40, No. 3, May 1996, p. 283-300.

* cited by examiner

*Primary Examiner* — Craig A. Renner
*Assistant Examiner* — Adam B Dravininkas
(74) *Attorney, Agent, or Firm* — Zilka-Kotab, PC

(57) ABSTRACT

A magnetic write transducer includes a yoke having a lower pole portion, an upper pole portion, and a first bobbin portion; a first coil turn wrapped around the first bobbin portion of the yoke in a first plane; a second coil turn wrapped around the first bobbin portion of the yoke in a second plane above the first plane; a third coil turn wrapped around the First bobbin portion of the yoke in a third plane above the second plane; and a fourth coil turn wrapped around the first bobbin portion of the yoke in a fourth plane above the third plane.

11 Claims, 11 Drawing Sheets

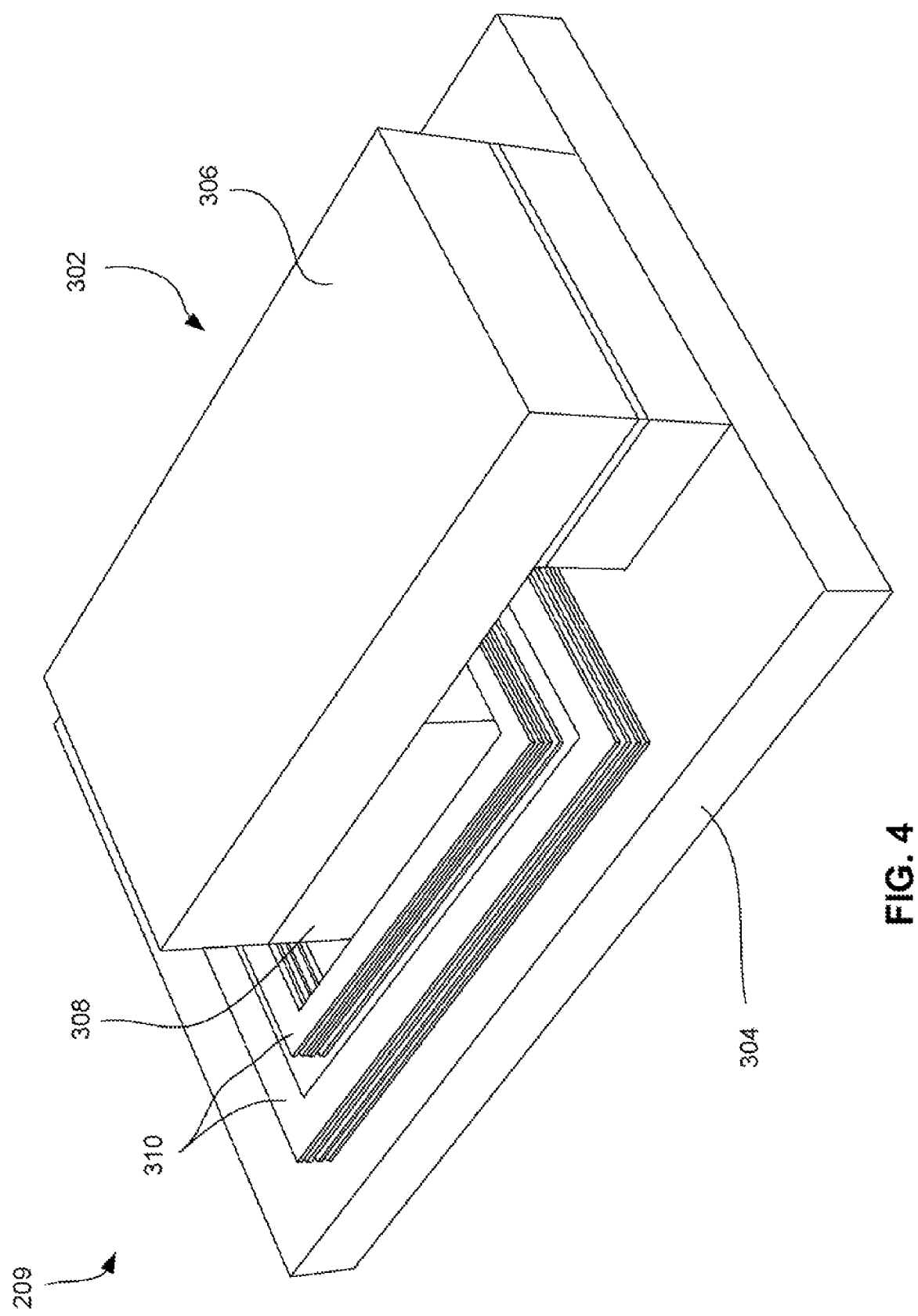

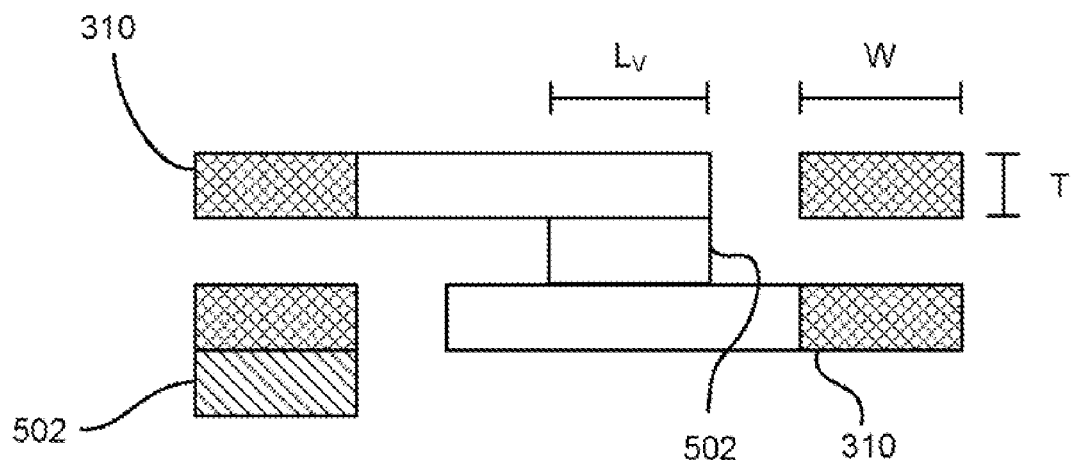
FIG. 5A
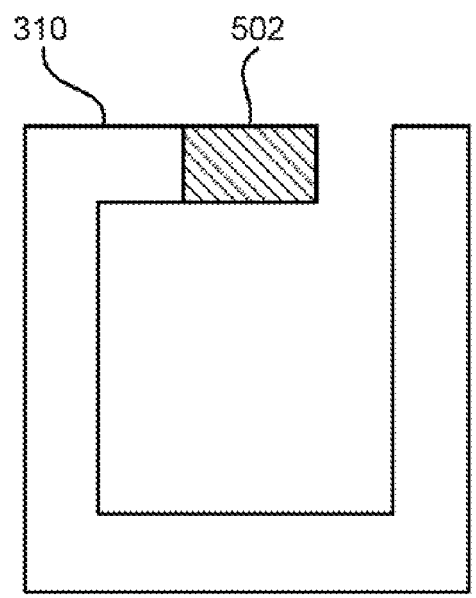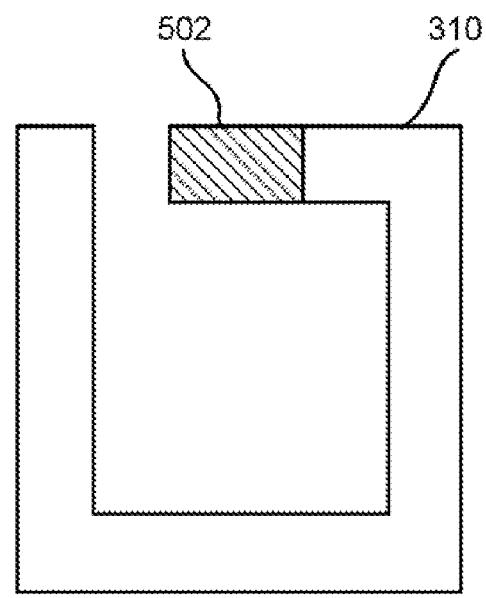
FIG. 5B          FIG. 5C

MAGNETIC WRITE TRANSDUCER

FIELD OF THE INVENTION

The present invention relates to magnetic head structures, and more particularly, this invention relates to a magnetic head structure having multiple modules.

BACKGROUND OF THE INVENTION

Business, science and entertainment applications depend upon computers to process and record data, often with large volumes of the data being stored or transferred to nonvolatile storage media, such as magnetic discs, magnetic tape cartridges, optical disk cartridges, floppy diskettes, or floptical diskettes. Typically, magnetic tape is the most economical and convenient means of storing or archiving the data. Storage technology is continually pushed to increase storage capacity and storage reliability. Improvement in data storage densities in magnetic storage media, for example, has resulted from improved medium materials, improved magnetic read/write heads, improved error correction techniques and decreased areal bit sizes. The data capacity of half-inch magnetic tape, for example, is now measured in hundreds of gigabytes on 512 or more data tracks.

To record data on a magnetic medium such as a magnetic tape or a disk, a write transducer traditionally generates a magnetic flux that sets magnetic transitions in the medium in a manner corresponding to binary data. Conventional writers have electrically conducting coils that wrap around a yoke in one or more planes. This design is sometimes referred to as a "pancake" configuration. The yoke transports the flux generated by the coil to a pole tip, which has a non-magnetic gap where the flux forms a field that fringes into the medium.

The coils are generally plated copper, which is a good conductor. However, since many windings may be needed for generating the flux necessary to overcome the coercive force of the media at a reasonable current the width of the writer can be very large. Thus, pancake configurations are often made with two layers of coils, but even these can be very wide. This large width, however, limits how closely writers may be spaced in an array, such as on a multitrack tape head. The more wraps in a single-plane coil, the wider the overall writer is, potentially making spacing an issue. Stacking coil layers is possible, but the plated coils themselves are relatively thick and require complex insulation processing. The resultant transducers are relatively tall, and the extra height can degrade magnetic performance by lengthening the yoke and constricting flux (saturation).

When a tape is written, the span of data just written is the span of the head elements. However, expansion and contraction of the tape prior to reading results in misregistration between the altered tape and the head. Present tapes typically expand and contract by approximately 1 part in 1000, or 0.1%.

In current Linear Tape Open (LTO) systems, the heads include servo readers that are approximately 2.9 mm apart. The tape media also includes servo tracks having a spacing of approximately 2.9 mm, thereby defining data bands of approximately 2.9 mm wide. A 0.1% expansion over 2.9 mm results in 2.9 micrometers of expansion. Accordingly, the data tracks themselves must be greater than the reader widths plus 2.9 micrometers or the readback will suffer from expansion- or contraction-induced misregistration. This may be reduced somewhat by shingling tracks according to how much the tape is dilated or contracted at the time of writing. However, this requires prior knowledge of exact servo reading positions and other knowledge. Accordingly, present tape formats are reaching their limits as far as increasing track density is concerned. To illustrate, consider the following example.

Assume tracks are not shingled, as may be the case for some products. Then, read sensor width is chosen to be about ½ the track width on the tape. Assume that the tracks are 6 micrometers wide. The sensor is then 3 microns wide. If at the outer tracks, there is 3 micrometers of tape expansion misregistration, the readers over the outer data bands will be riding along the edge of the data track. Then the reader may go off the track due to uncompensated lateral tape excursions. Accordingly, the track widths (in this example) cannot be made smaller without increased risk of misreads due to tape lateral transients.

One method for compensating for tape lateral expansion and contraction is statically rotating the head and then making small angular adjustments to keep the readers/writers in the head aligned to tracks on the tape. However, the static rotation leads to skew-related misregistration and is generally complex and difficult to implement. For example tilted heads must be constructed so as not to steer tape, etc.

Another proposed solution attempts to control the tape width by controlling tape tension. However, this method works over a limited range only, and generally does not provide enough control.

What is therefore needed is a magnetic write transducer that is very compact in comparison to traditional pancake type writers. Such a write transducer would enable such things as creation of a multi-transducer head an element array having a shorter span, which in tarn alleviates many of the detrimental effects of tape lateral expansion and contraction.

SUMMARY OF THE INVENTION

A magnetic write transducer according to one embodiment of the present invention includes a yoke having a lower pole portion, an upper pole portion, and a first bobbin portion; a first coil turn wrapped around the first bobbin portion of the yoke in a first plane; a second coil turn wrapped around the first bobbin portion of the yoke in a second plane above the first plane; a third coil turn wrapped around the first bobbin portion of the yoke in a third plane above the second plane; and a fourth coil turn wrapped around the first bobbin portion of the yoke in a fourth plane above the third plane.

A magnetic write transducer according to another embodiment of the present invention includes a yoke having a lower pole portion, an upper pole portion, and a first bobbin portion; a first pair of coil turns wrapped around the first bobbin portion of the yoke in a first plane, only two turns being present in the first plane; and a second pair of coil turn wrapped around the first bobbin portion of the yoke in a second plane, only two turns being present in the second plane.

A magnetic write transducer according to yet another embodiment of the present invention includes a yoke having a lower pole portion, an upper pole portion, and a first bobbin portion; a first coil turn wrapped around the first bobbin portion of the yoke in a first plane; and a second coil turn wrapped around the first bobbin portion of the yoke in a second plane above the first plane, a majority of the second coil turn being in vertical alignment with the first coil turn.

A magnetic tape head according to a further embodiment of the present invention includes a series of write transducers formed on a common substrate, each of the write transducers comprising: a yoke having a lower pole portion, an upper pole portion, and a first bobbin portion; a first coil turn wrapped around the first bobbin portion of the yoke in a first plane; a second coil turn wrapped around the first bobbin portion of the yoke in a second plane; and a third coil turn wrapped around the first bobbin portion of the yoke in a third plane.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should he made to the following detailed description read in conjunction with the accompanying drawings.

FIG. 4 is a perspective view of a write transducer according to one embodiment of the present invention.

FIG. 5A is a partial cross sectional view taken from Line 5A-5A of FIG. 3.

FIGS. 5B-C depict adjacent coil turns and the via therebetween.

BEST MODE FOR CARRYING OUT THE INVENTION

Figure 1:
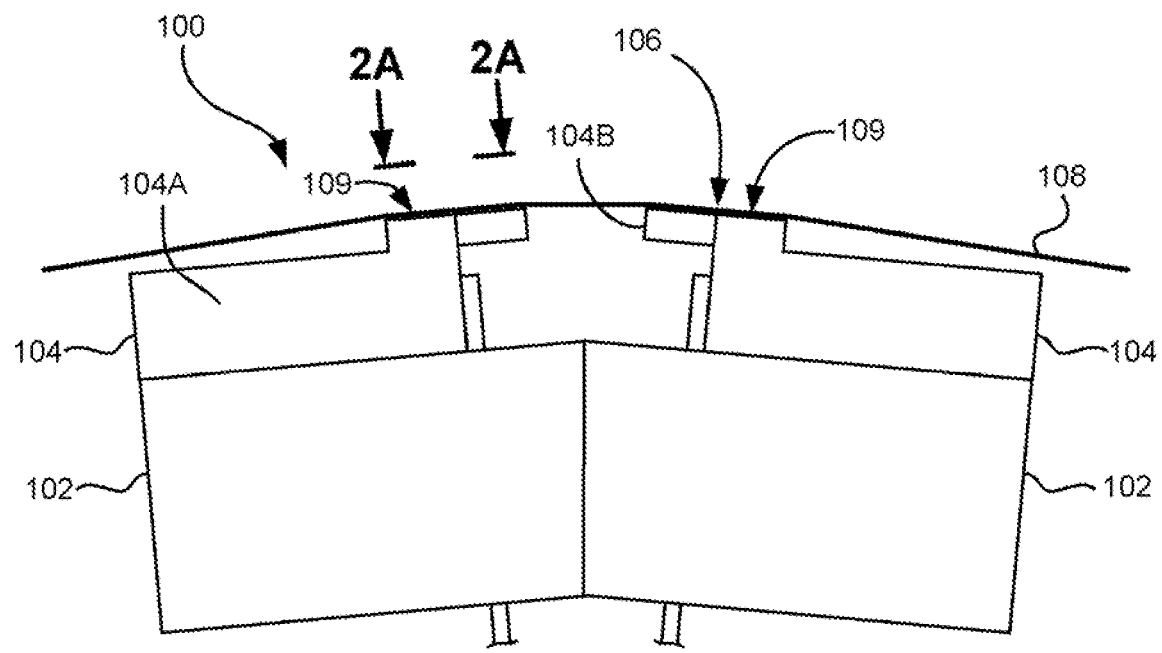
FIG. 1 illustrates a flat-lapped magnetic tape head according to one embodiment of the present invention.

The following description is the best mode presently contemplated for carrying out the present invention. This description is made for the purpose of illustrating the general principles of the present invention and is not meant to limit the inventive concepts claimed herein. Further, particular features described herein can be used in combination with other described features in each of the various possible combinations and permutations.

In the drawings, like and equivalent elements are numbered the same throughout the various figures.

The embodiments described below disclose a new write transducer design for magnetic recording of all types, in which coils are wrapped around a bobbin portion of the yoke. Some of the advantages that, may be provided by some or all of the various embodiments are compact size, tight spacing of adjacent write transducers on wafer and on multi-transducer head, high efficiency and bandwidth, low inductance, low eddy current losses, and the device may be formed by dry processing, etc.

FIG. 1 illustrates a flat-lapped bi-directional, two-module magnetic tape head 100, in accordance with one embodiment of the present invention. As shown, the head includes a pair of bases 102, each equipped with a module 104. The bases may be "U-beams" that are adhesively coupled together. Each module 104 includes a substrate 104A and a closure 104B with readers and writers 106 situated therebetween. In use, a tape 108 is moved over the modules 104 along a tape bearing surface 109 in the manner shown for reading and writing data on the tape 108 using the readers and writers 106. Conventionally, a partial vacuum is formed between the tape 108 and the tape bearing surface 109 for maintaining the tape 108 in close proximity with the readers and writers 106.

Figure 2B:
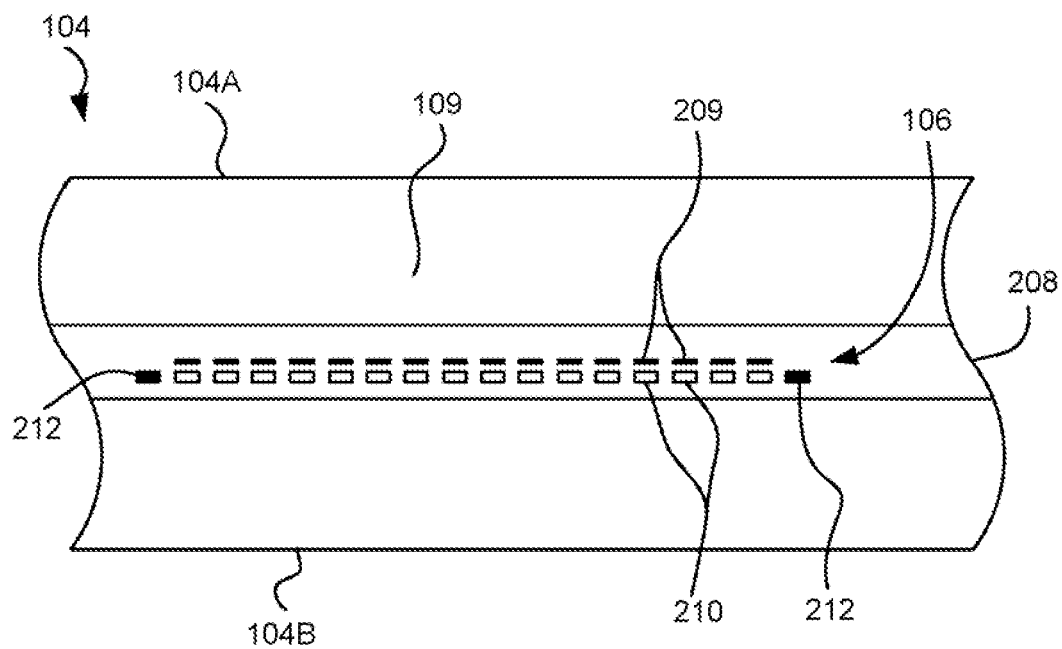
FIG. 2B is a detailed view taken from Circle 2B of FIG 2A.
Figure 2A:
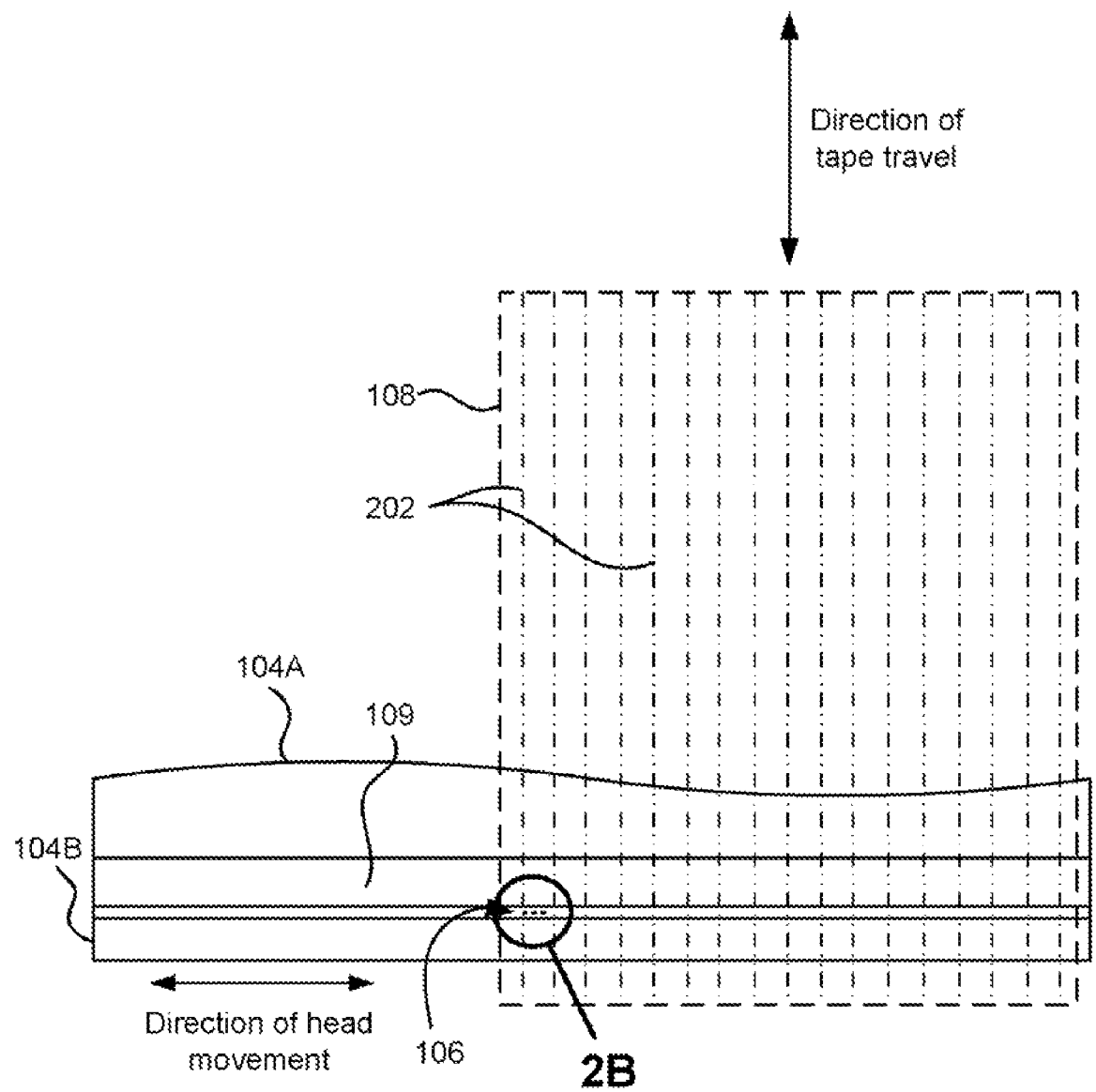
FIG. 2A is a tape bearing surface view taken from Line 2A-2A of FIG. 1.

FIG. 2A illustrates the tape bearing surface 109 of one of the modules 104. A representative tape 108 is shown in dashed lines. The module is long enough to be able to support the tape as the head steps between data bands. The data bands are defined between servo tracks 202. Each data band may include a number of data tracks, for example 96 data tracks (not shown). During read/write operations, the transducers 106 are positioned within one of the data bands. Outer readers, sometimes called servo readers, read the servo tracks 202. The servo signals are used to keep the transducers 106 aligned with a particular track during the read/write operations. Typically, a coarse positioner (worm gear, etc.) places the head generally adjacent a given data track, then a fine positioner (voice coil, etc.) keeps the heads aligned using the servo tracks. Alternatively, both functions may be combined into a single voice coil positioner.

FIG. 2B depicts a plurality of read and/or write transducers 106 formed in a gap 208 on the module 104 of FIG. 2A. As shown, the array of transducers 106 includes, for example, 16 writer transducers or "writers" 209, 16 read transducers or "readers" 210 and two servo readers 212, though the number of transducers may vary. Illustrative embodiments include 8, 16, 24, 32, and 40 transducers per array 106. A preferred embodiment includes 24 readers per array and/or 24 writers per array. This large number of channels allows the tape to travel more slowly for a given net data rate, thereby reducing speed-induced tracking and mechanical difficulties. While the readers and writers may be arranged in a piggyback configuration as shown in FIG. 2B, the readers 210 and writers 209 may also be arranged in an interleaved configuration. Alternatively, each array of transducers 106 may be readers or writers only, and the arrays may contain one or more servo readers. As noted by considering FIGS. 1 and 2A-B together, each module 104 may include a complementary set of transducers 106 for such things as bi-directional reading and writing, read-while-write capability, etc.

In preferred embodiments, the width of the servo head is such that transition broadening effects are minimized. Giant Magnetoresistive (GMR) and Tunneling Magnetoresistive (TMR) devices are preferably used in servo readers for advanced formats which may require servo readers having small track widths such as 0.5 micrometers.

Figure 3:
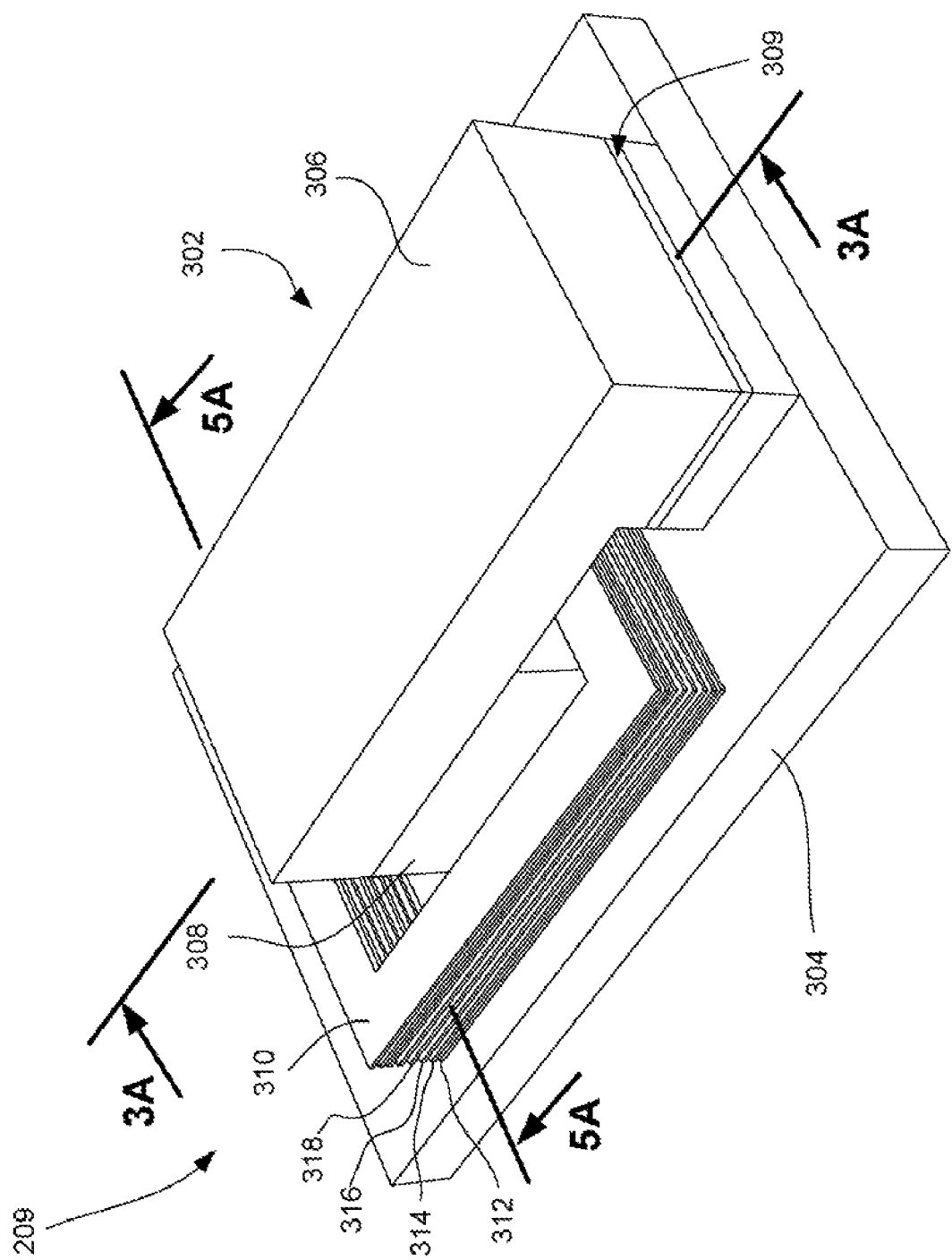
FIG. 3 is a perspective view of a write transducer according to one embodiment of the present invention.

FIG. 3 conceptually illustrates a magnetic write transducer 209 according to one approach of the present invention. As shown, the write transducer 209 includes a yoke 302 having a lower pole portion 304, an upper pole portion 306, a first bobbin portion 308 and a magnetic gap 309. The lower and upper pole portions 304, 306 may be formed of conventional materials and by conventional processes. Similarly, the first bobbin portion 308 may be formed of conventional materials and by conventional processes, and may even be formed concurrently with, or as part of, one of the pole portions 304, 306 or the coil turns 310. As will be apparent to those skilled in the art, the shapes of the various parts of the write transducer 209 may vary from those shown. For example, the coil turns may be circular or oblong or have radiused corners.

The write transducer 209 includes a first coil turn 312 wrapped at least partially around the first bobbin portion 308 of the yoke 302 in a first plane. A second coil turn 314 is wrapped around the first bobbin portion of the yoke in a second plane above the first plane. A third coil turn 316 is wrapped around the first bobbin portion of the yoke in a third plane above the second plane. A fourth coil turn 318 is wrapped around the first bobbin portion of the yoke in a fourth plane above the third plane.

Additional planes of coil turns may also be present. For instance, the embodiment shown in FIG. 3 has coil turns 110 in eight different planes. Other approaches may have more or fewer planes of coil turns. As known to those skilled in the art, the flux generated is proportional to the number of turns times the current, and so the number of turns can be selected based on the desired current level, or vice versa, in conjunction with the flux output requirements and maximum allowed current, which itself is set by coil heating and electromigration limits. In generally preferred approaches, about 5 to about 14 turns are present, though the number could be higher or lower.

Referring to FIG. 3, the write transducer 209 has multiple coil turns 310, where only one coil turn is present in each of the planes. This approach enables low overall width of the write transducer, and thus allows very narrow arrays of writers to be formed on a single substrate. Further, the coil turns are positioned close to the write gap. Thus, the write transducer is more efficient than traditional pancake designs, because the flux in the embodiments presented herein has less distance to travel through the yoke. Accordingly, the shorter coil-to-write gap spacing results in a write transducer that is both more efficient and less subject to losses such as eddy losses.

Figure 3A:
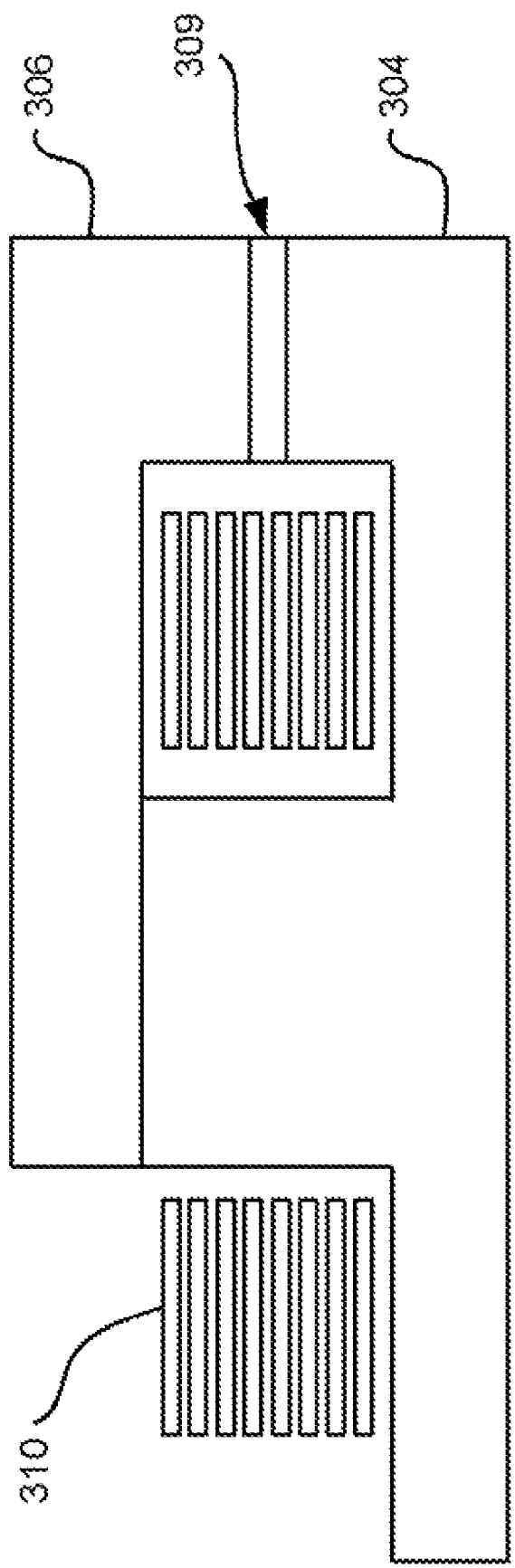
FIG. 3A is a partial cross sectional view taken from Line 3A-3A of FIG. 3.
Figure 3B:
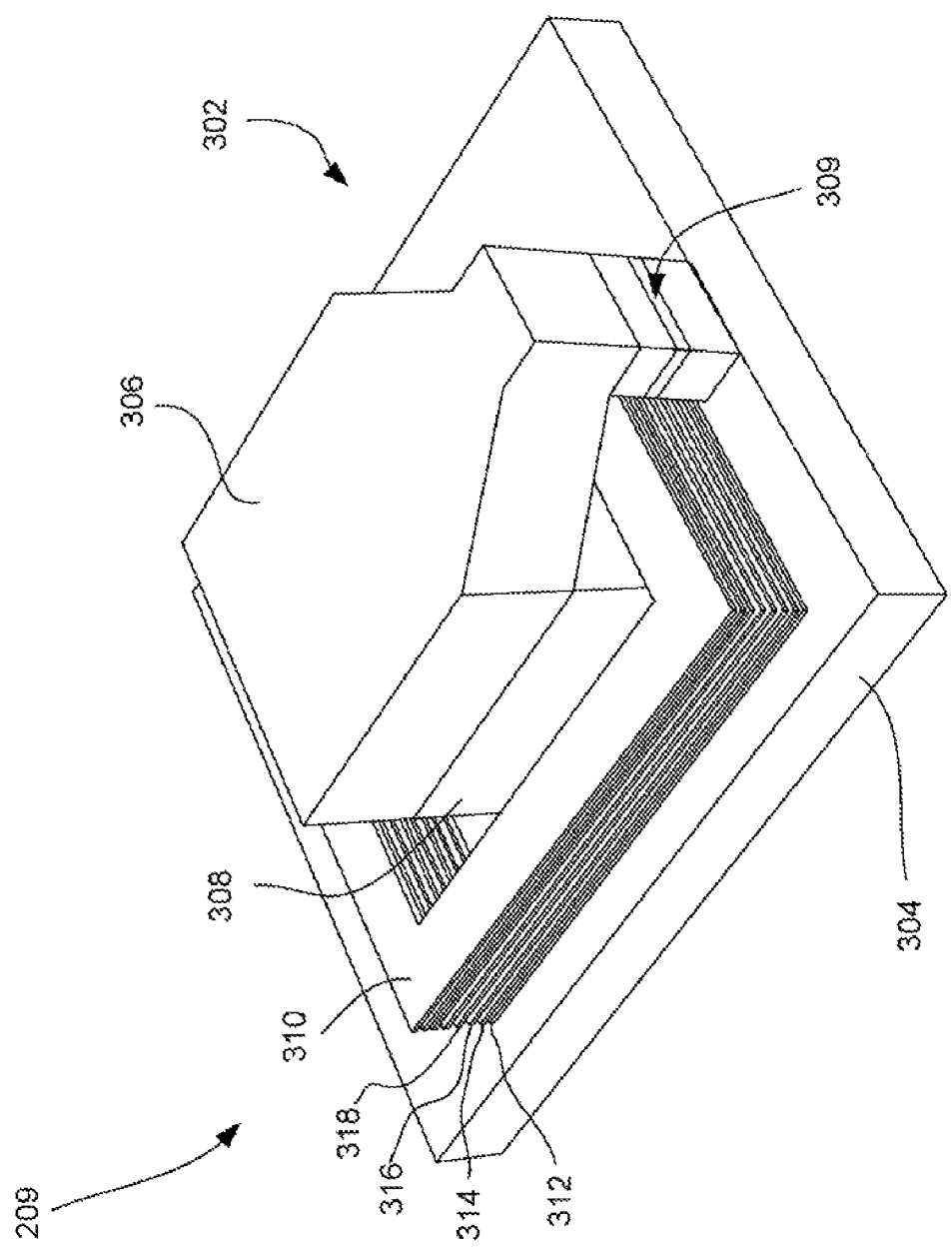
FIG. 3B is a perspective view of a write transducer according to one embodiment of the present invention.

As shown in FIG. 3A, the write gap 309 may be centered along the vertical height of the coil stack.

FIG. 5B illustrates another embodiment having tapered poles. In this embodiment, the front gap will saturate first.

FIG. 4 conceptually illustrates an alternate embodiment 290 in which more than one coil turn 310 is present in each plane. Placing multiple coils a single plane reduces the number of planes required, but has the disadvantage of limiting how tightly spaced adjacent write transducers may be fabricated. Thus, in order to minimize the overall width of the write transducer, the number of coil turns in a single plane may preferably be limited to two (a pair), three or four turns.

In variations of the present invention, a single coil turn might be found in one plane while multiple coil turns are found in another plane. Further, while the coil turns are shown in FIGS. 3-4 as being generally vertically aligned, coil turns in one plane might also be offset from coil turns in another plane.

The cross sectional shape of the coil turns is not critical to the invention, and is typically approximately rectangular as a result of vacuum processing methods. As shown in FIG. 5A, a preferred cross sectional shape of a coil turn 310 is generally rectangular, with a cross sectional thickness T (vertical thickness taken perpendicular to the plane of deposition) being generally less than an average or maximum width W of the coil turn (horizontal width along the plane of deposition). A single tier arrangement of wide, thin coils enables minimizing both the overall width of the write transducer as well as the overall profile of the write transducer, while producing the desired level of flux. When selecting the thickness T and width W of the coil turns, consideration is given to such things as flux output, dimensions of the finished write transducer, resistance in the coil, power dissipation, electromigration, etc. An illustrative thickness T of each of the coil turns is between about 0.1 to about 1 micron, though could be higher or lower. An illustrative cross sectional width W of each of the coil turns is between about 1 and about 20 microns, though could be higher or lower. An illustrative thickness of the insulation layers between the coil turns is between about 0.1 to about 0.5 micron, though could be higher or lower.

Each of the coil turns 310 may be coupled to an adjacent coil turn by an electrically conductive via 502. As shown in FIG. 5A (insulation layers omitted), the vias 502 couple the coil turns 310 together to form a continuous coil. The upper and lower coil turns may then be coupled to leads (not shown) or other electrical connectors for receiving an electrical write signal, in a conventional manner. FIGS. 5B-C depict facing sides of adjacent coil turns 310 and the via 502 therebetween.

Figure 5D:
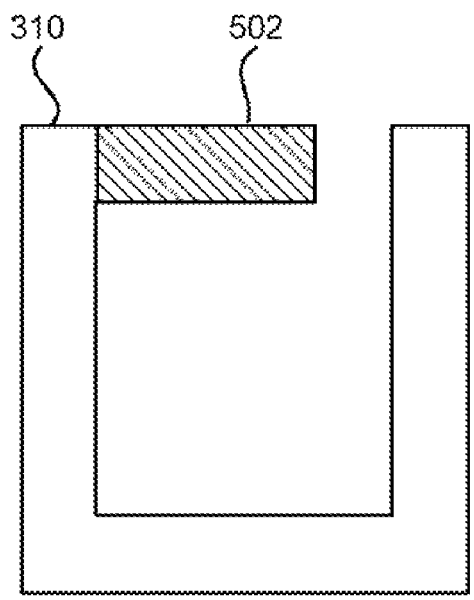
FIGS. 5D-E depict adjacent coil turns having a via with a larger cross sectional area.
Figure 5E:
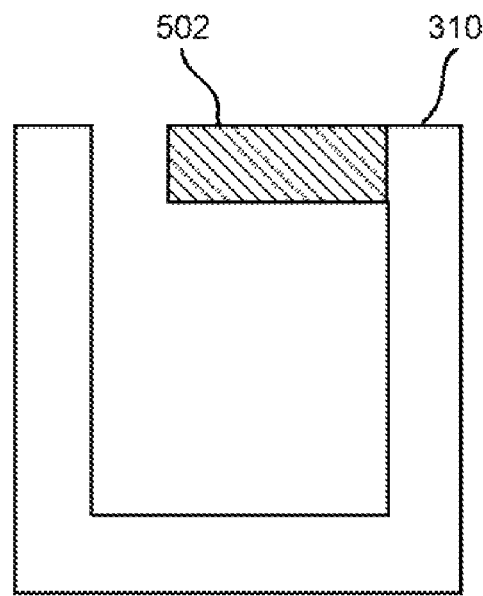

In one preferred approach, one or more of the vias 502 has an elongate length $L_V$ defined in a direction parallel to a plane of deposition thereof, wherein the elongate length $L_V$ of the via is preferably about 1-2× the thickness T of a coil turn coupled thereto. The vias may be elongated even further for higher processing yield. However, long contacts tend to effectively shorten the coil length, thus reducing the effective number of turns. Elongated vias are more easily formed than those formed in small via holes FIGS. 5D-E depict facing sides of adjacent coil turns 310 having a via 502 therebetween with a larger cross sectional area.

The cross sectional shape of the vias is not critical to the invention.

In embodiments where there are multiple coil turns in a given plane, e.g., as in FIG. 4, a single via may connect all coil turns in one plane to all coil turns in another plane. Alternatively, vertically aligned coil turns may be coupled together, e.g., the inner set of coil turns are coupled together by a first set of vias while an outer set of coil turns are coupled together by a second set of vias. Combinations of these are also anticipated.

The coil turns may be formed of any electrically conductive material, with traditional materials such as copper and gold being preferred. The vias may be formed of conventional materials, and may be of the same or different material than the coil turn(s). Furthermore, the vias may be simply openings in the insulation between turns to allow one turn to contact another.

Traditionally, writer coils are formed by plating, to achieve the desired thickness and line resolution. Likewise, the coil turns in the various embodiments of the present invention may be formed by plating. However, plating is an expensive process in terms of both materials and production time, as well as has the inherent drawbacks of wet processes. Accordingly, in preferred embodiments, the coil turns are formed by a dry process such as vacuum deposition by chemical vapor deposition, ion-beam deposition, sputtering, etc.

Figure 6:
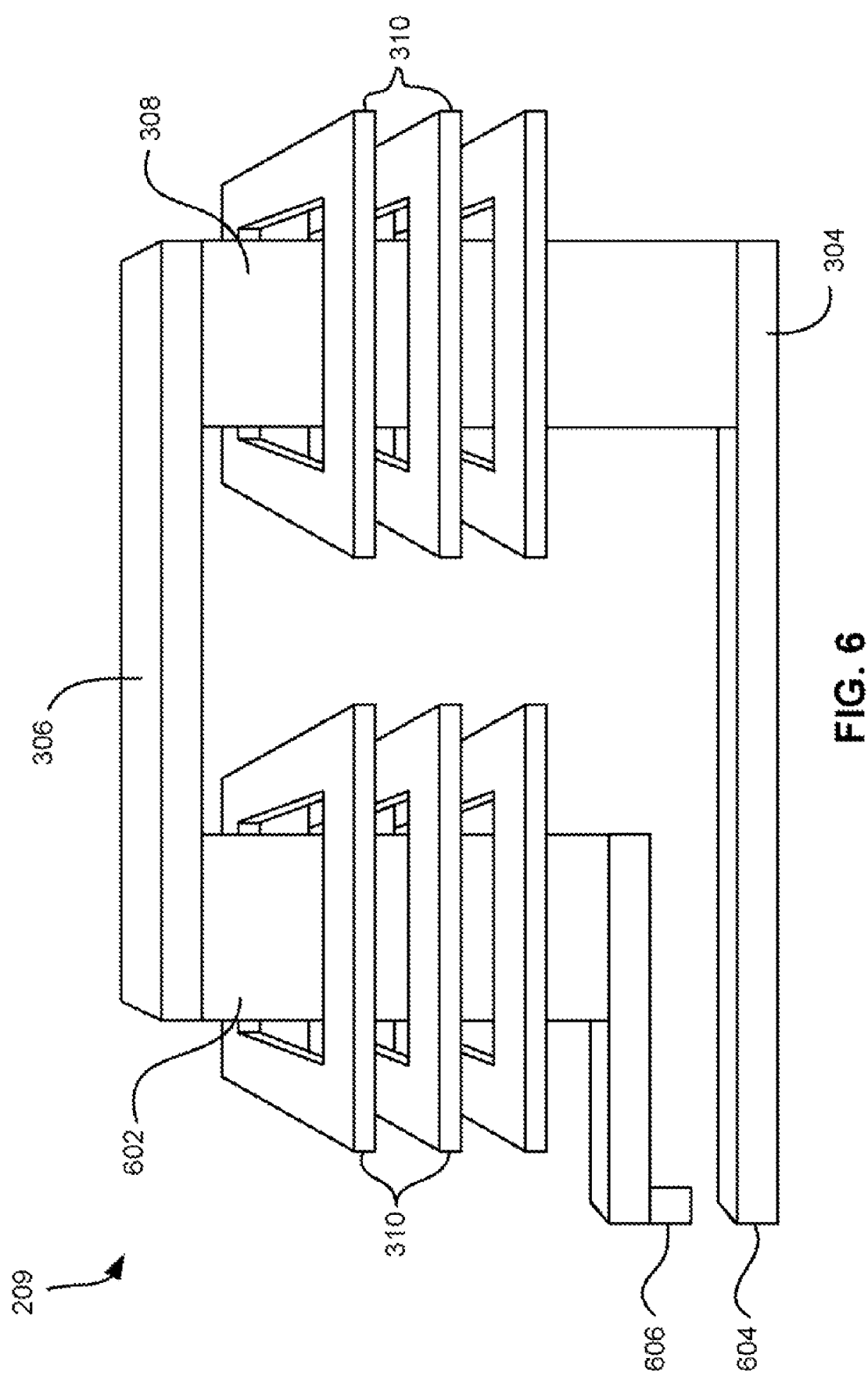
FIG. 6 is a perspective view of a write transducer according to one embodiment of the present invention.

FIG. 6 conceptually illustrates a write transducer 209 having a second bobbin portion 602, according to one embodiment of the present invention. As shown, the second bobbin portion 602 is positioned between the first bobbin portion 308 and pole tips 604, 606 of the pole portions 304, 306. One or more coil turns 310 may wrap around the second bobbin portion 602.

The embodiment shown in FIG. 6 enables reducing the number of planes of thin-film materials which must be formed while optionally avoiding multiple turns in each thin-film plane. A possible disadvantage is that the front portion of the yoke must be far enough back from the tape bearing surface to accommodate a coil turn. Although the write transducer 209 shown has three coil turns at both front and rear of the yoke, the front (towards the second bobbin portion 602) may have more or fewer coil turns than the rear.

The write coils in the various embodiments of the present invention enable, among other things, close spacing of the write transducer elements in a multi-track thin-film tape recording head. Such close spacing makes registration between head and tracks on tape much less sensitive to tape width changes.

For maximum writing efficiency, a preferred embodiment is one where the coil turns proximate to the recording gap are arranged in close proximity thereto. Alternatively, the inventive concepts presented herein may be combined with conventional barber pole coils that wrap the top or bottom poles, or both.

Figure 7:
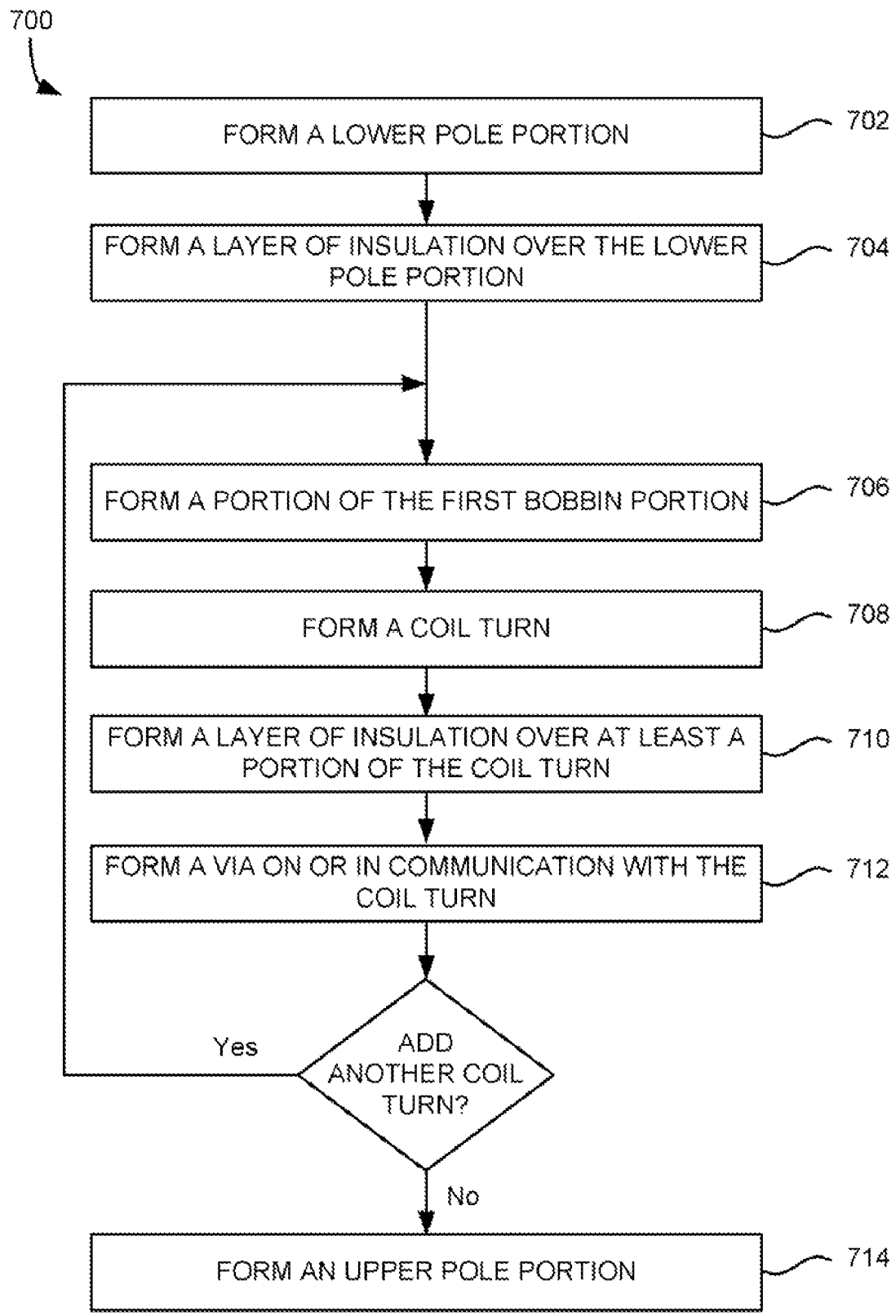
FIG. 7 is a process diagram of a method for forming a write transducer according to one embodiment of the present invention.

FIG. 7 illustrates a method 700 for forming a magnetic write transducer such as that shown in FIG. 3, according to one embodiment of the present invention. In step 702, a lower pole portion is formed by conventional processes. In step 704, a layer of insulation is formed over the lower pole portion, except at the site of the first bobbin portion, which may be defined by masking or other suitable means. In step 706, the mask is opened and a portion of the first bobbin portion is formed. In step 708, a coil turn is formed. In a vacuum deposition process, for example, step 708 may include masking the structure to define the coil turn, depositing the coil turn, and then removing the mask. Alternatively, the mask may remain as a layer of insulation, the structure being planarized via chemical mechanical polishing (CMP) or other appropriate process to remove any conductive material formed above the mask. In a wet process, step 708 may include depositing a seed layer, then plating to form the coil turn, followed by planarization.

In step 710, a layer of insulation is formed over at least a portion of the coil turn. In step 712, a via is formed on or in communication with the coil turn.

Steps 706-712 are repeated to form the remaining coil turns, vias, and parts of the first bobbin portion.

In step 714, an upper pole portion is formed, the upper pole portion and lower pole portion forming a yoke.

Note that the steps need not be performed in the order listed. For example, steps 710 and 712 can be easily reversed. Nor are all steps necessarily required. Further, those skilled in the art will appreciate that there are a plethora of ways to form the structures of the present invention, and accordingly, the method of FIG. 7 has been presented to show an example of one of the many suitable methods of fabrication.

Figure 8:
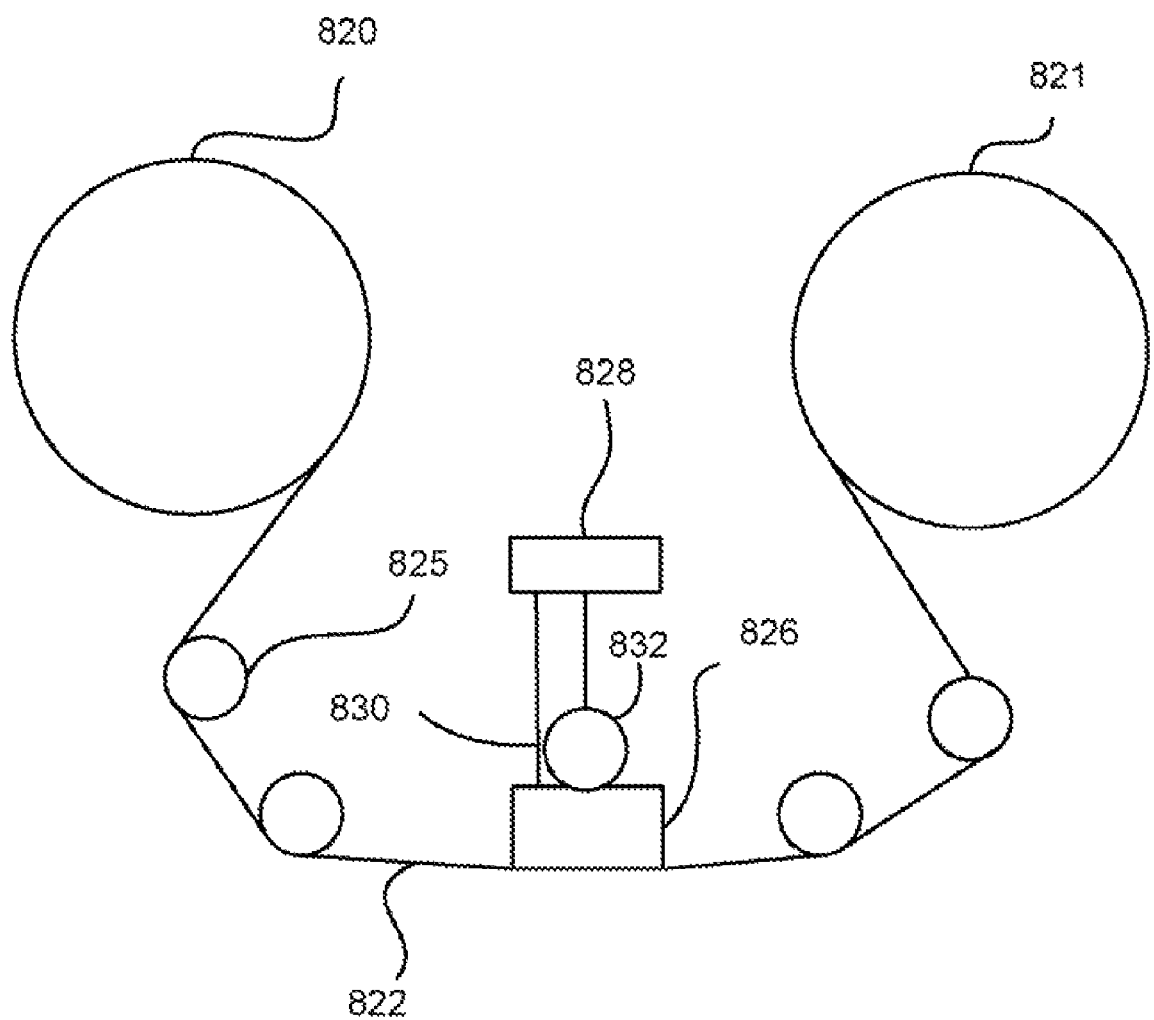
FIG. 8 is a schematic diagram of a tape drive system according to one embodiment of the present invention.

FIG. 8 illustrates a simplified tape drive which may be employed in the context of the present invention. While one specific implementation of a tape drive is shown in FIG. 8, it should be noted that the embodiments of the previous figures may be implemented in the context of any type of tape drive system.

As shown, a tape supply cartridge 820 and a take-up reel 821 are provided to support a tape 822. These may form part of a removable cassette and are not necessarily part of the system. Guides 825 guide the tape 822 across a preferably bidirectional tape head 826, of the type disclosed herein. Such tape head 826 is in turn coupled to a controller assembly 828 via a write-read cable 830. The controller 828 in turn, controls head functions such as servo following, writing, reading, etc. An actuator 832 controls position of the head 826 relative to the tape 822.

A tape drive, such as that illustrated in FIG. 8, includes drive motor(s) to drive the tape supply cartridge 820 and the take-up reel 821 to move the tape 822 linearly over the head 826. The tape drive also includes a read/write channel to transmit data to the head 826 to be recorded on the tape 822 and to receive data read by the head 826 from the tape 822. An interface is also provided for communication between the tape drive and a host (integral or external) to send and receive the data and for controlling the operation of the tape drive and communicating the status of the tape drive to the host, all as will be understood by those of skill in the art.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A magnetic write transducer, comprising:
  a yoke having a lower pole portion, an upper pole portion, and a first bobbin portion;
  a first coil turn wrapped around the first bobbin portion of the yoke in a first plane; and
  a second coil turn wrapped around the first bobbin portion of the yoke in a second plane above the first plane, a majority of the second coil turn being in vertical alignment with the first coil turn,
  wherein the coil turns are offset such that no two coil turns reside in a same plane.
  wherein each coil turn has four sections arranged in a rectangular shape,
  wherein the sections in each coil turn have about a constant cross sectional width as measured in the plane of deposition thereof and perpendicular to a longitudinal axis thereof,
  wherein the sections in the associated coil turn have about the same cross sectional width,
  wherein only one coil turn is present in any one of the planes.

2. The transducer as recited in claim 1, wherein each of the coil turns has at least two adjacent sections lying along different longitudinal axes and each having straight opposite sides, the opposite sides extending between upper and lower surfaces of the associated coil turn.

3. The transducer as recited in claim 1, wherein each of the coil turns are coupled together by an electrically conductive via extending vertically through a horizontal plane that does not intersect any of the coil turns, wherein the via has an elongate length defined in a direction parallel to a plane of deposition thereof, wherein the elongate length of the via is at least as long as a thickness of a coil turn coupled thereto.

4. The transducer as recited in claim 1, wherein a cross sectional thickness of each of the coil turns is less than the cross sectional width of the sections of the coil turn.

5. The transducer as recited in claim 1, wherein the coil turns are formed by a dry process, wherein the portions of the first bobbin portion are individually formed layers laminated upon each other, wherein back sections of the second and third coil turns positioned on an opposite side of the bobbin relative to pole tips of the pole portions are vertically aligned along a plane extending perpendicular to planes of deposition of the coil turns and parallel to a media facing side of the magnetic write transducer, wherein the coil turns are offset such that no two coil turns reside in a same plane, wherein at least three of the four sections have straight opposite sides, the opposite sides extending between upper and lower surfaces of the associated coil turn.

6. A magnetic write transducer, comprising:
  a yoke having a lower pole portion, an upper pole portion, and a first bobbin portion;
  a first coil turn wrapped around the first bobbin portion of the yoke and being positioned entirely below a first plane oriented parallel to a plane of deposition of the first coil turn;

a second coil turn wrapped around the first bobbin portion of the yoke, the second coil turn being positioned entirely below a second plane and above the first plane;

a third coil turn wrapped around the first bobbin portion of the yoke, the third coil turn being positioned entirely below a third plane and above the second plane; and a fourth coil turn wrapped around the first bobbin portion of the yoke, the fourth coil turn being positioned entirely below a fourth plane and above the third plane, wherein the first, second, third and fourth planes are parallel to one another;

a first conductive via extending vertically through the first plane for electrically coupling the first coil turn to the second coil turn;

a second conductive via extending vertically through the second plane for electrically coupling the second coil turn to the third coil turn;

a third conductive via extending vertically through the third plane for electrically coupling the third coil turn to the fourth coil turn;

wherein each of the coil turns has four sections arranged in a rectangular shape, an outer periphery defined by the sections of each coil turn being defined in a plane of deposition of the associated coil turn, wherein the sections in each coil turn have about a constant cross sectional width as measured in the plane of deposition thereof and perpendicular to a longitudinal axis thereof, wherein the sections in the associated coil turn have about the same cross sectional width, wherein only one coil turn is present between adjacent planes.

7. The transducer as recited in claim 6, wherein the coils are spaced from each other and all portions of each coil lie between the planes adjacent thereto.

8. The transducer as recited in claim 6, wherein at least one of the vias has an elongate length defined in a direction parallel to a plane of deposition thereof, wherein the elongate length of the at least one of the vias in the plane that the via extends through is at least as long as a thickness of a coil turn coupled thereto.

9. The transducer as recited in claim 6, wherein a cross sectional thickness of each of the coil turns is less than the cross sectional width of the sections of the coil turn, wherein the portions of the first bobbin portion are individually formed layers laminated upon each other.

10. A magnetic write transducer, comprising:

a yoke having a lower pole portion, an upper pole portion, and a first bobbin portion;

a first coil turn wrapped around the first bobbin portion of the yoke and being positioned entirely below a first plane oriented parallel to a plane of deposition of the first coil turn;

a second coil turn wrapped around the first bobbin portion of the yoke, the second coil turn being positioned entirely below a second plane and above the first plane;

a third coil turn wrapped around the first bobbin portion of the yoke, the third coil turn being positioned entirely below a third plane and above the second plane; and a fourth coil turn wrapped around the first bobbin portion of the yoke, the fourth coil turn being positioned entirely below a fourth plane and above the third plane, wherein the first, second, third and fourth planes are parallel to one another;

a first conductive via extending vertically through the first plane for electrically coupling the first coil turn to the second coil turn;

a second conductive via extending vertically through the second plane for electrically coupling the second coil turn to the third coil turn;

a third conductive via extending vertically through the third plane for electrically coupling the third coil turn to the fourth coil turn;

wherein each of the coil turns has four sections arranged in a rectangular shape, an outer periphery defined by the sections of each coil turn being defined in a plane of deposition of the associated coil turn, wherein the sections in each coil turn have about a constant cross sectional width as measured in the plane of deposition thereof and perpendicular to a longitudinal axis thereof, wherein the sections in the associated coil turn have about the same cross sectional width, wherein only one coil turn is present between adjacent planes, wherein each of the coil turns has at least two adjacent sections lying along different longitudinal axes and each having straight opposite sides, the opposite sides extending between upper and lower surfaces of the associated coil turn, wherein back sections of the second and third coil turns positioned on an opposite side of the bobbin relative to pole tips of the pole portions are vertically aligned along a plane extending perpendicular to planes of deposition of the coil turns and parallel to a media facing side of the magnetic write transducer, wherein the coil turns are offset such that no two coil turns reside in a same plane, wherein each of the coil turns has at least three sections having straight opposite sides, the opposite sides extending between upper and lower surfaces of the associated coil turn.

11. The transducer as recited in claim 10, further comprising a layer of insulation over the lower pole portion; and a layer of insulation over at least a portion of the each of the coil turns, wherein the first bobbin portion has several independently, non-continuously-formed portions in a contiguous stack.

* * * * *